ND. 122,755

UNITED STATES PATENT OFFICE.

JOHN BRIGGS, OF BOSTON, MASSACHUSETTS.

IMPROVEMENT IN PAINTS FROM MAGNESITE.

Specification forming part of Letters Patent No. 122,755, dated January 16, 1872.

Specification describing a certain Improved Paint called "Magnesia White," invented by JOHN BRIGGS, of Boston, in the county of Suffolk and State of Massachusetts.

The object of this invention is to provide a cheap and serviceable white pigment or basis for white and colored paints—a pigment which, when ground in linseed-oil or any other suitable medium, will make a paint having opacity, density, white color, good-wearing "body," and in many respects resembling the common paint made by grinding white lead in linseed-oil.

I have discovered that the mineral substance known by the name "magnesite," which is a natural carbonate of magnesia, when ground to fine powder forms a white pigment having the above-mentioned properties, and that it will make a cheap and useful paint when ground in suitable mediums or vehicles.

To enable others to make use of my invention, I will describe one mode of making white paint, which I call "magnesia-white," from this mineral, as follows: I take the magnesite as it is obtained from mines or quarries in this or other countries, and grind it to very fine powder in suitable mills. I then mix and grind this powder with linseed-oil, making them into paint in the ordinary manner known to manufacturers of white-lead paint. I generally use about eighty-five pounds of the pulverized magnesite with fifteen pounds of linseed-oil; but these proportions may be varied. Other pigments may be ground and mixed with the magnesite for the purpose of coloring, extending, or changing the character of the paint; and the magnesite may be calcined or roasted before it is mixed with the oil; but I do not recommend this preparation of the mineral when it is to be used in common paints.

I prefer to use the mineral magnesite because it can be obtained in large quantities. It is cheap, and has the desirable qualities when finely pulverized; but I have also used and desire to secure the common carbonate of magnesia of commerce for this purpose.

Having thus described my invention, I claim and desire to secure by Letters Patent—

1. A paint, composed of the mineral magnesite or carbonate of magnesia ground in linseed-oil or any other suitable vehicle, as herein described.

2. A paint made of the mineral magnesite or carbonate of magnesia ground with other pigments or bases in any suitable vehicle, as herein set forth.

JOHN BRIGGS.

Witnesses:
    EDWARD W. E. TOMPSON,
    H. E. COOPER. (107)